United States Patent
Cahill-O'Brien et al.

(10) Patent No.: US 7,994,933 B2
(45) Date of Patent: Aug. 9, 2011

(54) FREQUENCY SHIFT COMPENSATION, SUCH AS FOR USE IN A WIRELESS UTILITY METER READING ENVIRONMENT

(75) Inventors: Barry Cahill-O'Brien, Spokane, WA (US); Mark K. Cornwall, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 1082 days.

(21) Appl. No.: 10/591,995

(22) PCT Filed: Mar. 30, 2005

(86) PCT No.: PCT/US2005/011205
§ 371 (c)(1), (2), (4) Date: Jun. 22, 2007

(87) PCT Pub. No.: WO2005/099093
PCT Pub. Date: Oct. 20, 2005

(65) Prior Publication Data
US 2008/0001779 A1    Jan. 3, 2008

Related U.S. Application Data

(60) Provisional application No. 60/558,522, filed on Mar. 30, 2004.

(51) Int. Cl.
*G08B 23/00*    (2006.01)

(52) U.S. Cl. .............. 340/870.02; 340/870.03; 675/316; 675/376; 455/39; 455/500; 455/63.1

(58) Field of Classification Search ........... 340/870.02–870.03; 375/316, 375/376; 455/39, 500, 63.1; 370/503
See application file for complete search history.

(56) References Cited

U.S. PATENT DOCUMENTS

| | | | |
|---|---|---|---|
| 5,128,625 A | | 7/1992 | Yatsuzuka et al. |
| 5,673,252 A | * | 9/1997 | Johnson et al. ............... 370/449 |
| 6,556,621 B1 | * | 4/2003 | Richards et al. ............. 375/150 |
| 6,965,585 B2 | * | 11/2005 | Grilli et al. .................... 370/331 |
| 7,079,610 B1 | * | 7/2006 | Johansson et al. ........... 375/350 |

OTHER PUBLICATIONS

Samadian, S. et al., "Demodulators for a Zero-IF Bluetooth Receiver," IEEE Journal of Solid-State Circuits, vol. 38, No. 8, Aug. 2003, pp. 1393-1396.

Sevenhans, J. et al., "Trends in Silicon Radio Large Scale Integration: Zero IF Receiver! Zero I & Q Transmitter! Zero Discrete Passives!" IEEE Communications Magazine, Jan. 2000, pp. 142-147.

* cited by examiner

*Primary Examiner* — Albert K Wong
(74) *Attorney, Agent, or Firm* — Dority & Manning, P.A.

(57) ABSTRACT

Methods and apparatus for computing the carrier frequency of a transmitter using frequency modulated digital data to compensate for frequency shifting of the transmitter and the receiver local oscillators and for bandwidth adjustment of the receiver's filter. In particular, methods and apparatus are disclosed for binary systems transmitting "1" and "0" data using decoded or undecoded received signals.

9 Claims, 5 Drawing Sheets

FREQUENCY SHIFT COMPENSATION, SUCH AS FOR USE IN A WIRELESS UTILITY METER READING ENVIRONMENT

CROSS-REFERENCE TO RELATED APPLICATION(S)

This application is a U.S. National Phase application of PCT/US2005/011205, filed Mar. 30, 2005, which claims the benefit of U.S. Provisional Patent Application No. 60/558,522, filed Mar. 30, 2004, both of which are incorporated herein by reference.

TECHNICAL FIELD

The embodiments described below relate generally to wireless utility data collection systems, and more particularly, to compensating frequency drifts of transmitters and receivers.

BACKGROUND

Wireless transceivers, such as those used in wireless utility meter reading, often utilize a radio frequency (RF) signal to send data between a transmitter and a receiver. In an ideal frequency modulated (FM) system, the frequency of the transmitter and the receiver are matched. Even a slight difference in frequency can lead to a reduction in system performance.

Both cost and accuracy of a system suffer as a result of compensating for frequency shifting between the transmitter and the receiver. In order to keep the costs down, less expensive oscillator circuits are often used. Errors in frequency can result from temperature shifts, aging, mechanical shock, and manufacturing tolerances. These errors tend to be randomly distributed and change over time. Consequently, frequency accuracy may drift, and if the drift is too great, then the receiver may not be able to decode the incoming signals.

Typically, to compensate for the frequency difference of a transmitter and its corresponding receiver, either a system is designed with stable and accurate reference oscillators, which in many cases are expensive, or the bandwidth of the system is widened so that the shifts in frequency fall within the bandwidth of the receiver. Widening the bandwidth can lower the signal-to-noise ratio (SNR) of the system, which, in turn, decreases the performance of the system. The SNR measures the strength of a signal relative to the background noise and is measured in decibels (dB). Maximizing the SNR can increase the performance of the system.

Specific modulation schemes compensates for the shift in frequency between the transmitter and the receiver. One modulation scheme, called quadrature modulation, subdivides a binary data stream into pairs of two bits and represents each pair with one of four levels before performing modulation. Quadrature Phase Shift Keying (QPSK) refers to a type of quadrature modulation in which two data bits represent four different possibilities: 0 degrees, 90 degrees, 180 degrees, and −90 degrees. These four levels correspond to positions around the unit circle when the unit circle represents phase. One drawback of QPSK is that large phase changes at the end of each symbol (pair of two data bits) can lead to undesirable transitions if the waveform is to be filtered and subsequently processed by a nonlinear power amplifier.

Another popular type of modulation is binary frequency shift keying (BFSK). In BFSK, binary baseband data selects one of two carrier frequencies with equal amplitudes: one carrier frequency corresponds to a "1" and the other carrier frequency corresponds to a "0". In effect, the "frequency" is "shifted" to "key" the data. Since the frequency shifts or "keys" between two frequencies, the process is referred to as binary frequency shift keying.

Automatic utility meter reading represents one application that employs wireless transceivers. While these transceivers employ QPSK or BFSK, they suffer from frequency shifting; therefore, stable frequency sources are necessary.

DETAILED DESCRIPTION

Figure 1:
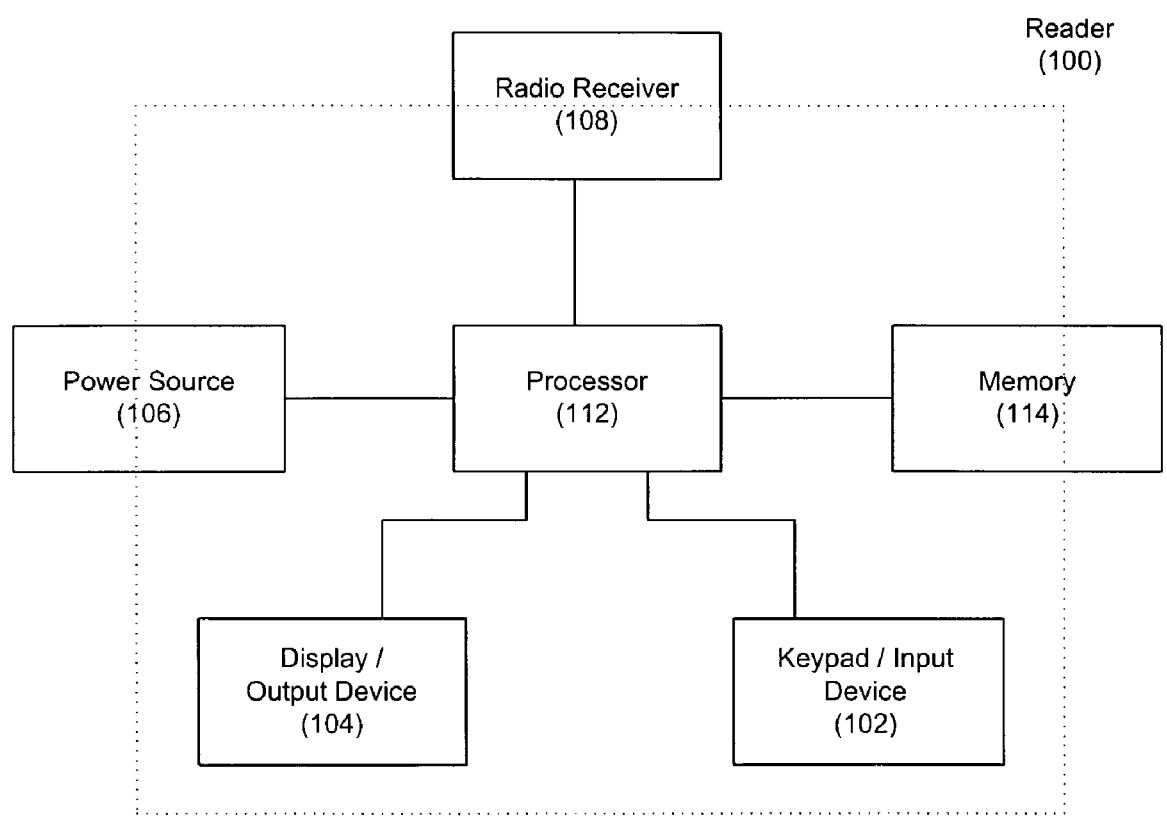
FIG. 1 is a block diagram of components of a meter reading device, configured to employ a frequency compensating process, according to an embodiment of the invention.

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

As described below, in some embodiments, a transmitter first sends a known symbol at a low data rate, where the symbol contains both states of frequency modulated (FM) binary data. Because the data rate is low, the receiver can widen its bandwidth and maintain the same sensitivity as it has during a normal high data rate transmission and detect a minimum signal level with an acceptable signal-to-noise ratio (SNR). The receiver needs only widen its bandwidth to the maximum possible frequency shift between the transmitter and the receiver. To determine the maximum possible frequency shift, and therefore the necessary bandwidth, the receiver uses a reference frequency to compute drifts and deviation errors.

As explained below, one embodiment of the invention employs a zero IF (intermediate frequency) receiver. A typical zero IF receiver mixes an incoming FM signal with a reference signal at the exact or expected carrier frequency of the transmitted signal, and produces an output baseband signal that is equal to the original FM modulation deviation. The original FM modulation deviation refers to the difference of the frequency of a transmitter's local oscillator (LO) from the frequencies at which the binary data are transmitted. The resulting signal is then demodulated to recover an original data stream with minimal noise.

If the transmitter and the receiver are not exactly matched in frequency, then a received signal, when mixed down to baseband, contains an error signal in addition to a modulated signal. The error signal equals the difference between a transmitter carrier frequency and a receiver reference frequency. If this error is sufficiently large, it may reduce the performance of the receiver in a meter-reading system. The computed error, as described by the embodiments of the invention, is used to adjust a receiver's LO frequency and its bandwidth to allow the reception of a signal with an estimated maximum frequency error.

Sample System Application

Typical meter reading devices come in two forms: (1) manual input and (2) automatic meter reading (AMR) devices. Manual input devices typically employ a keypad and a display on a portable device. A meter reader or operator views a meter and inputs the read data using the keypad. Automatic meter reading devices periodically gather data from a meter automatically, and transmit it to a collector.

In FIG. 1, one example of a reader 100 is shown as having a processor 112 that couples to the keypad 102 and display device 104. Various other output devices may be employed in addition to, or in lieu of, the visual display device, such as a printer, plotter, speakers, tactile or olfactory output devices, etc. Likewise, various other input devices may be employed in addition to, or in lieu of, the keyboard, such as a pointing device (for example, a mouse or track ball), touch-sensitive display, track pad, a microphone, joystick, pen, game pad, scanner, digital camera, video camera, etc. While not shown, the reader 100 may include a trigger switch, possibly in conjunction with a handle. Other input devices may include a keypad, and so forth. As described herein, a reduced number of keys may be provided over standard meter reading devices.

A memory module 114 stores data (e.g., images) and software routines executed by the processor, while a power source 106, such as rechargeable batteries, provide power to the reader 100. The memory may include any type of computer-readable media that can store data accessible by the reader 100, such as magnetic hard and floppy disk drives, optical disk drives, magnetic cassettes, tape drives, flash memory cards, digital video disks (DVDs), Bernoulli cartridges, RAMs, ROMs, smart cards, etc. The reader 100 also includes a radio transceiver 108 for capturing automatic meter reading (AMR) data.

While FIG. 1 shows a single processor 112, those skilled in the relevant art recognize that the reader 100 may employ multiple processors that divide tasks of routines. The term "processor" is generally used herein and refers to any logic processing unit, such as one or more central processing units (CPU), digital signal processors (DSP), application-specific integrated circuits (ASIC), etc. While the processor 112 and other components of the reader 100 are shown as separate blocks, some or all of these blocks may be monolithically integrated into a single chip.

Each of the blocks shown in FIG. 1 and other Figures are of a type known in the art, and one skilled in the relevant art would be able to use such circuits or subsystems to practice aspects of the invention. The internal details of these blocks are neither part of, nor critical to, aspects of the invention. Therefore, a detailed description of the internal circuit operation is not required for each of these blocks. Relevant functionality with respect to aspects of the reader 100 is described in detail herein.

The radio transceiver 108 permits wireless transmission and/or reception of signals. Other known modules may be included, such as a global positioning system (GPS) module, a telescoping pole or handle to suspend the reader 100 at a considerable distance from the ground to gather images from meters positioned at above ground-level locations, and so forth.

Figure 2:
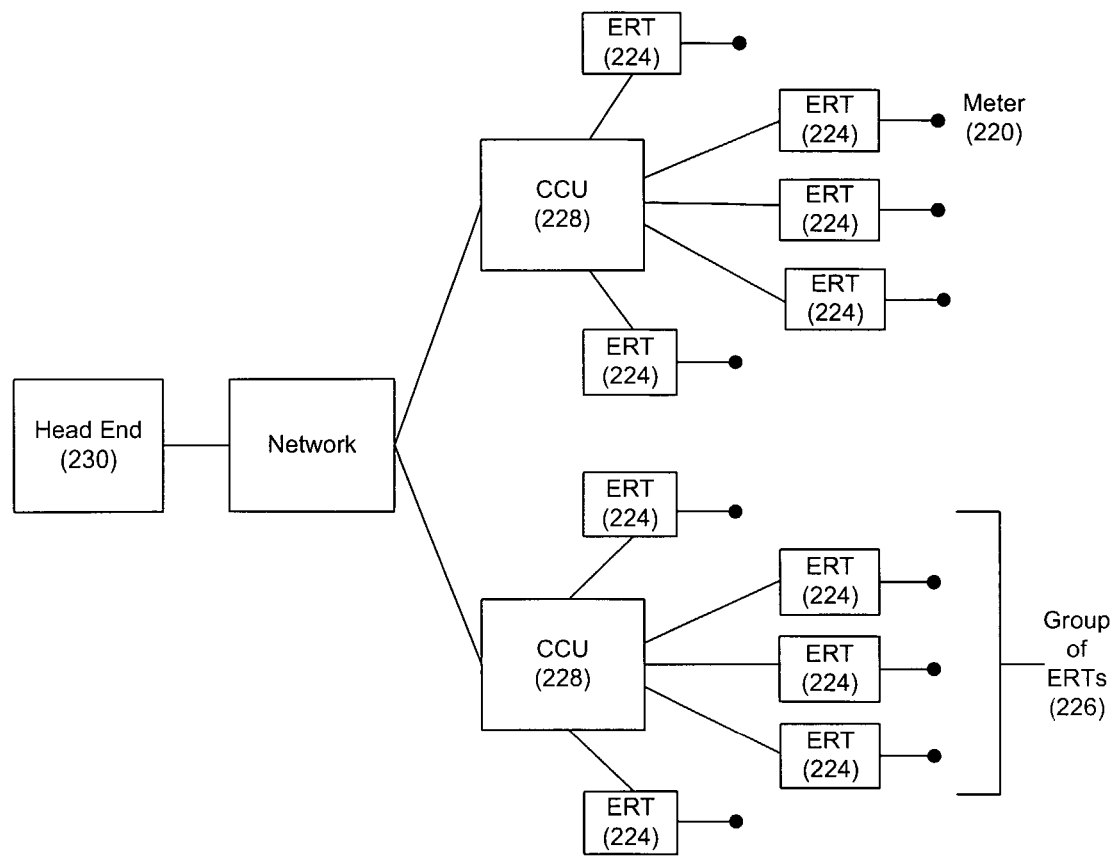
FIG. 2 is a block diagram of an example of a system utilizing a frequency compensating process.

In FIG. 2, another example of an automatic meter-reading system is shown as system 200 that includes a meter-reading data collection system having multiple meters 220 coupled to utility-consuming devices (not shown), such as electric, gas, or water consuming devices or locations. In this illustrated embodiment, each meter 220 includes an encoder receiver/transmitter module (ERT) 224, which serves as a data collection endpoint.

The ERTs 224 encode consumption, tamper information, and other data from the meters 220 and communicate such information to a central control unit (CCU) 228. The communication of this data may be accomplished via radio-to-radio data collection systems such as handheld, mobile automatic meter reading or fixed networks. The ERTs 224 can be retrofitted to existing meters or installed on new meters during the manufacturing process. In a system for electrical metering, the ERTs 224 may be installed under the glass of new or existing electric meters 220 and are powered by electricity running to the meter. Gas and water ERTs 224 can be attached to the meter 220 and powered by long-life batteries.

As shown in FIG. 2, a group of ERTs 224 communicates with one of the CCU devices 228, which in turn feeds collected data to a head-end system 230 via periodic uploads. This may occur on an ongoing basis (e.g., every half-hour) or as otherwise needed. The CCUs 228 may be implemented as neighborhood concentrators that read the ERTs 224, process data into a variety of applications, store data temporarily, and transport data to the head-end system 230 as needed. In some embodiments, the CCUs 228 can be installed on power poles or streetlight arms.

Further details about the system of FIG. 2 and similar systems can be found in the following commonly assigned patent applications: U.S. patent application Ser. No. 09/911,840, entitled "Spread Spectrum Meter Reading System Utilizing Low-speed/High-power Frequency Hopping," filed Jul. 23, 2001; U.S. patent application Ser. No. 09/960,800, entitled "Radio Communication Network for Collecting Data From Utility Meters," filed Sep. 21, 2001; and U.S. patent application Ser. No. 10/024,977, entitled "Wide Area Communications Network for Remote Data Generating Stations," filed Dec. 19, 2001.

Variable Filter System

Both systems, the reader 100 of FIG. 1 and the system 200 of FIG. 2, may employ RF receivers, such as an IF or a zero IF receiver. A zero IF receiver mixes a received signal directly to a baseband frequency rather than to an intermediate frequency. As a result, error detection occurs at the baseband frequency rather than at a higher frequency. Error detection at lower frequencies presents an advantage over error detection at higher frequencies since lower frequencies may be measured by inexpensive microcontrollers.

Some embodiments of the invention utilize a zero IF receiver. For example, a typical FM receiver receives a signal, such as 916 MHz, and subsequently mixes it with another frequency, such as 846 MHz, to get a 70 MHz difference signal that is then processed. With a zero IF receiver, however, a 916 MHz signal mixes with a local 916 MHz signal. If the FM modulation deviates by ±10 kHz, then this produces a plus or minus signal of 10 kHz which is then filtered and processed. It is generally easier to filter a lower frequency signal since there are, for example, effective, existing, and relatively inexpensive 12-pole filters.

In a zero IF receiver, a local oscillator (LO) is tuned to the center frequency of an intended received channel, for instance, the frequency of the carrier. The received signal typically deviates about this center frequency at some known deviation amount. For example, the center of the channel might be at 433 MHz and an RF signal on this channel modulates by ±10 kHz. The RF signal would then be 433.01 MHz for a digital "1" and 432.99 MHz for a digital "0." Low cost microcontrollers cannot measure high frequency signals of 433 MHz, but they can measure frequencies in the 10 kHz range.

In the zero IF system, a mixer down-converts the frequency of the received signal. In other words, the local oscillator (LO) shifts the frequency of the received signal to obtain a desired frequency band for subsequent demodulation. In a digital radio, this data is typically a "1" or a "0". For example, sending a "1" means that the frequency is increased from the carrier frequency, and sending a "0" means that the frequency is decreased from the carrier frequency.

Figure 3A:
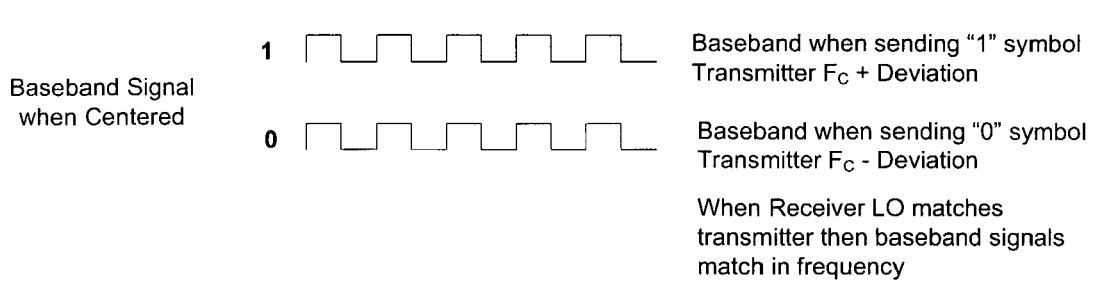
FIG. 3A illustrates two baseband signals, the top signal representing a frequency shift during a "1" transmission and the bottom signal representing a frequency shift during a "0" transmission, in a case when local oscillators in a transmitter and a receiver are matched.

FIG. 3A shows two centered baseband signals that have matched local oscillators in the transmitter and the receiver. The top baseband signal represents the frequency shift "$F_1-F_2$," when transmitting a "1". The bottom baseband signal represents the frequency shift, "$F_1-F_2$," when transmitting a "0," where $F_1$ is the transmitter LO frequency and $F_2$ is the receiver LO frequency. The top and bottom baseband signals are matched, meaning that they have the same frequency and that no error has been detected between the two. The baseband signals corresponding to "1" and "0" are matched because the output of the LO has the same frequency as the received signal carrier wave.

Figure 3B:
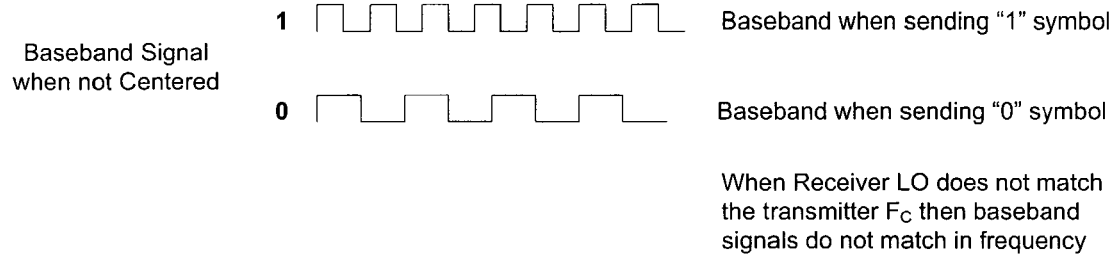
FIG. 3B illustrates two baseband signals, the top signal representing a frequency shift during a "1" transmission and the bottom signal representing a frequency shift during a "0" transmission, in a case when local oscillators in the transmitter and the receiver are not matched.

FIG. 3B shows two baseband signals, representing the frequency shifts when transmitting a "1" and a "0", that have a local oscillator in the transmitter and receiver that are not matched, introducing an error and causing the baseband signals to be un-centered. The frequency of the baseband signal during a "1" no longer matches the frequency of the baseband signal during a "0" because the frequency of the received signal carrier wave differs from the frequency of the output of the receiver's LO. As a result, the error may diminish the ability of the decoder to reconstruct the original data, and the radio sensitivity might decrease. If the error is sufficiently large, then the decoder may not be able to decode any data.

Figure 4:
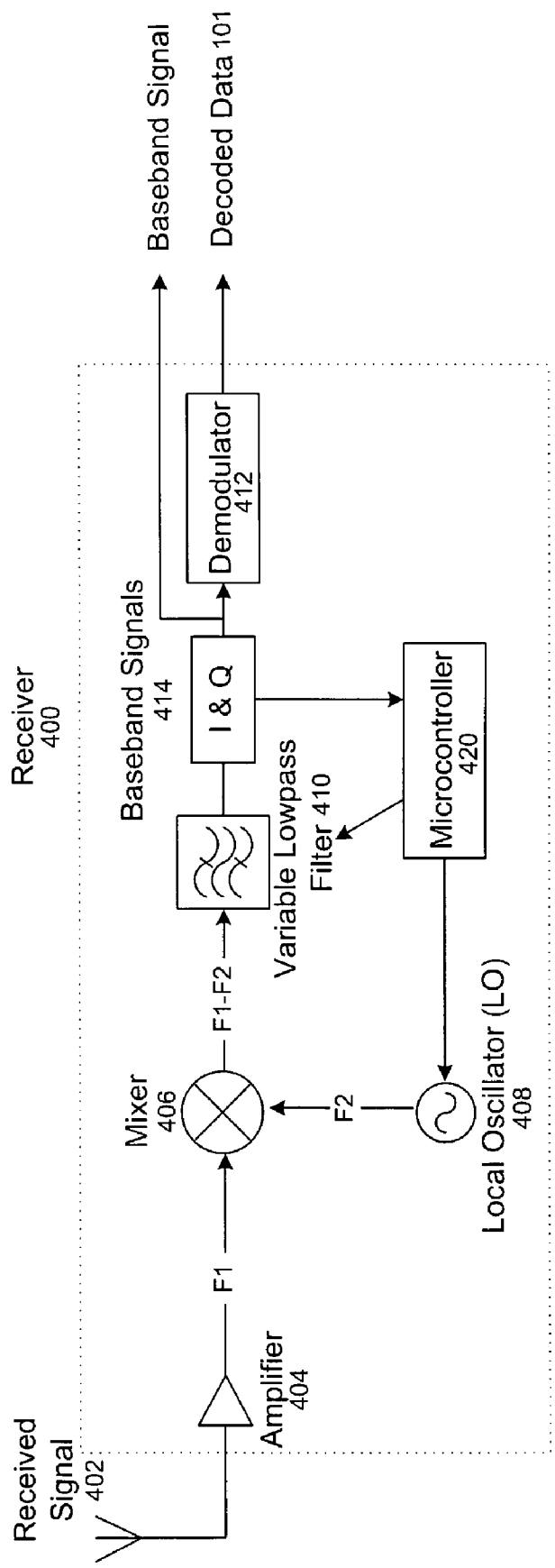
FIG. 4 illustrates components of a zero IF (intermediate frequency) receiver.

FIG. 4 shows components of a zero IF receiver 400 which may employ aspects of the invention. An amplifier 404 amplifies a received signal 402 to produce an amplified RF signal $F_1$. A local oscillator (LO) 408 in the receiver 400 produces a periodic signal at the same or the expected frequency of the received carrier wave. FIG. 4 shows that the LO 408 generates a signal $F_2$ that mixes with the amplified RF signal $F_1$ in a mixer 406. The mixer 406 effectively down-converts the received signal 402 and translates the received signal's frequency spectrum to a lower frequency to facilitate subsequent demodulation.

Preferably, the mixer 406 generates a signal representing the difference between $F_1$ and $F_2$, namely "$F_1-F_2$" which is the deviation of the transmitter from the expected center frequency, and in this example is 433 MHz. The output signal from the mixer 406, "$F_1-F_2$", enters into a variable lowpass or bandpass filter 410, with an ideal or predetermined frequency response, in order to limit the bandwidth of the receiver 400 for the purpose of decreasing interference from unwanted signals. The variable lowpass filter 410 passes the frequency components of the "$F_1-F_2$" signal that lie within the passband of the filter and eliminates frequency components that are outside the expected frequencies.

FIG. 4 shows that the Mixer 406 generates a pair of baseband signals 414, I (in-phase) and Q (quadrature). I and Q signals 414 enter a demodulator 412, which reconstructs the original data signal with minimal noise. While the two baseband signals 414, I and Q, are used to demodulate the data, only one of the signals is needed to detect the baseband frequency error between the received signal 402 and the LO 408. As explained below, the receiver 400 adjusts the LO 408 to a new centering frequency for more accurate decoding. (An example of a zero IF receiver chip that provides I and Q output signals is produced by BlueChip of Norway, Part No. BCC418.)

In a zero IF receiver, the down-conversion of the frequency spectrum of the received signal 402 to a lower frequency, to facilitate demodulation, results in the mixer 406 typically generating the baseband signals 414 I (in-phase) and Q (quadrature). I and Q signals 414 represent 10 kHz square waves in this example. When $F_1$ equals 433 MHz, 433.01 MHz corresponds to "$F_1+10$ kHz," representing a "1," and 432.99 MHz corresponds to "$F_1-10$ kHz," representing a "0".

The system 400 employs one of the baseband signals 414, I or Q, to detect a frequency error between the received signal $F_1$ 402 and the signal $F_2$ generated by the LO 408. The frequency error can be found by measuring the frequency shift during the transmission of a "1" and a "0". For example, if the endpoint frequency drifts high by 2 kHz, then the output of the mixer 206 would be 12 kHz during a "1" and 8 kHz during a "0".

From this frequency error, the receiver 400 determines the new centering frequency and adjusts the LO 408 to regain a good match for I and Q (e.g. an equal 10 KHz spread from the center frequency for "0" and "1"). The adjustment of the LO 408 ensures more accurate decoding and allows the system to compensate for frequency shifting. In this embodiment the transmitter first sends a known symbol at a low data rate, which represents the two binary data states, for example a "0" and a "1." Because the data rate is low during the initial communication, the receiver can widen its bandwidth and maintain the same sensitivity as during a normal high data rate transmission. The receiver need only widen its bandwidth to accommodate the maximum possible frequency shift between the transmitter and the receiver.

In particular, the receiver 400 examines the baseband signals 414 during an initial period of communications when a known low data rate symbol is sent. The receiver 400 increases the bandwidth of the receiver filter to allow an estimated worst case frequency error to pass. The system 400 may not need to adjust for bandwidth, depending on the expected frequency error. If the worst case error exceeds the bandwidth of the filter, then the filter bandwidth is increased. But, if the bandwidth is sufficient to accept the worst case frequency error, then the filter may be left unchanged.

A microcontroller 420 provides a control or filter adjustment signal to the variable lowpass filter 410. For example if, during normal operation, the lowpass filter 410 has a lowpass bandgap of approximately 30 kHz, then the microcontroller 420 causes the variable lowpass filter to widen its bandgap during the initial communication period to approximately 60 kHz, centered on the expected baseband frequency. With the widened bandwidth, the microcontroller 420 then analyzes the frequency error between a "1" and a "0" in this example.

By examining the relationship of the baseband signal frequencies during the "1" and "0" portions of the known low rate symbol, the receiver 400 can determine the frequency error and adjust its local oscillator 408 until the signal becomes appropriately centered. Thus, the microcontroller 420 also provides a frequency compensation signal to the LO 408, which in response, adjusts its frequency to match the carrier frequency of the received signal 402.

The microcontroller 420 may provide another filter adjustment signal to the variable lowpass filter 410 to allow the bandwidth to return to a narrower state so that the filter 410 again reduces or eliminates interference from unwanted signals and improves the SNR at the receiver. When the actual data follows the known low data rate symbol, the receiver 400 is matched in frequency with the transmitter, and the sensitivity of the receiver 400 improves. Increasing the bandwidth of the baseband filter may reduce sensitivity for decoding the actual data, but enables the receiver 400 to find the carrier frequency.

Once the carrier frequency of the signals is found, the receiver 400 can calculate the error and center the LO 408, reducing the baseband bandwidth to regain sensitivity. Calculating the frequency error between $F_1$ and $F_2$ in this embodiment requires the receiver 400 to receive only a single "1" and a single "0." Under an alternative embodiment, the receiver need only analyze one bit, a "1" or a "0." Thus, this alternative can permit quicker frequency compensation, but can require greater accuracy or a longer signal preamble during the initial communication period. If the receiver knows how a "1" or a "0" is modulated, for example that a "1" is modulated by adding a deviation frequency to the transmitter carrier frequency, the receiver will recognize the arrived bit and will not need to know which binary value to expect.

In another alternative embodiment, the receiver will expect the signal to be shifted up by half of the modulation range ($\frac{1}{2}M$) and thus be transmitted by $(F_1+\frac{1}{2}M)$ frequency during the first data state of symbol transmission; therefore, the receiver will move its reference up by this amount. The incoming transmission will generate a baseband signal equal to $Error_1$. The demodulated signal will go high if the generated baseband signal is above the receiver reference, and low if it is below the receiver reference. At this point, the receiver computes the frequency of the baseband signal. This determines the error, and the direction of the error (+/−). Note that $Error_1$ has a polarity given by the state of the modulated bit, i.e. $Error_1$ is positive in this example if the modulated bit is a "1" and is negative if the modulated bit is a "0."

The receiver can now adjust its reference signal down by the modulation amount (M), expecting the new signal to be shifted down by half of the modulation amount ($\frac{1}{2}M$) and be transmitted by $(F_1-\frac{1}{2}M)$ frequency. During the second data state of the symbol transmission, the receiver will generate a baseband signal equal to $Error_2$. The receiver obtains the frequency of this baseband signal, and checks the state of the demodulated output to determine the polarity of the error. $Error_1$ and $Error_2$ contain all the information for the computation of the carrier frequency of the transmitter, as follows:

$$Error_1 - Error_2 = D, \text{ the deviation of the transmitter}$$

$$Error_1 - \frac{1}{2}D = \text{frequency difference between the transmitter}$$
$$LO \text{ frequency and the receiver } LO \text{ frequency}$$

$$= \frac{1}{2}(Error_1 + Error_2).$$

In another embodiment, the receiver does not adjust its carrier frequency for either of the arriving data states of the data symbol, rather the receiver mixes both data state signals with the same LO frequency. Therefore, a frequency $B_1$ of the generated baseband signal, representing the down-converted data signal transmitted by $(F_1+\frac{1}{2}M)$ frequency, is equal to $(Error_1+\frac{1}{2}M)$ in the previous embodiment, and a frequency $B_2$ of the generated baseband signal, representing the down-converted data signal transmitted by $(F_1-\frac{1}{2}M)$ frequency, is equal to $(Error_2-\frac{1}{2}M)$ in the previous embodiment. Again, the demodulated signal will go high, if the generated baseband signal is above the receiver reference, and low if it is below the receiver reference, which determines the direction of the error (+/−).

In this alternative embodiment the frequency difference between the transmitter reference and the receiver reference is merely the average of the two baseband signals, as illustrated below:

$$\frac{1}{2}(B_1+B_2)=\frac{1}{2}[(Error_1+\frac{1}{2}M)+(Error_2-\frac{1}{2}M)]=\frac{1}{2}(Error_1+Error_2),$$

which is the same as in the previous example.

In yet another embodiment the receiver may mix both data state signals with a frequency lower than the receiver reference frequency to place the down-converted frequencies $B_1$ and $B_2$ within any desired frequency range. In this embodiment also, the frequency difference between the transmitter reference and the receiver reference is merely the average of the two baseband signals $B_1$ and $B_2$. This is a down-conversion between a typical IF and a zero IF conversion.

In yet another embodiment, the transmitter frequency modulates the first binary number by adding $M_1$ to the transmitter carrier frequency and the second binary number by subtracting $M_2$ from the transmitter carrier frequency. The receiver 400 then mixes both data signals with the estimated carrier frequency of the transmitter. The frequency $B_1$ of the generated baseband signal, represents the down-converted data signal modulated by $(F_1+M_1)$ frequency and the frequency $B_2$ of the generated baseband signal, represents the down-converted data signal transmitted by $(F_1-M_2)$ frequency. Again, the demodulated signal will go high, if the generated baseband signal is above the receiver reference, and low if it is below the receiver reference, which determines the direction of the error (+/−); however, the advance knowledge of the order of data signals is not required. In this embodiment the frequency difference between the transmitter reference and the receiver reference is computed by:

$$B_2+M_2(B_1-B_2)/(M_1+M_2).$$

Any of the above mentioned computations may be performed, for example, by the microcontroller 420.

Following the data symbol transmission, the transmitter sends the data payload, using its normal data rate and protocol. The receiver can adjust its reference frequency and bandwidth to exactly match the transmitter, and thus optimize system performance. The duration of the initial symbol need only be long enough for the receiver to acquire the symbol, and make the required adjustments In the embodiments described above, the receiver 400 uses un-decoded data, which tends to be fast, precise, and accurate. Traditionally, the use of un-decoded signals to determine frequency error has been ignored in favor of using decoded signals. The receiver 400, which utilizes un-decoded signals to determine frequency error, can be used in a variety of applications, such as for stable, low cost, low power meter-reading transceivers in a narrow band, high performance system.

In another alternative embodiment, decoded data output determines a center frequency. If the decoded data output is asymmetrical, then an offset in the frequency may occur. The LO is adjusted and the decoded data output is checked again for symmetry. This alternative takes several "1"s and "0"s to determine the frequency error that is then removed by a successive approximation of symmetry errors. If the endpoint frequency is too far off, then a data decoder may not be able to decode data out of the frequency deviation and the receiver will have to search for the endpoint signal. This method relies on decoded data which tends to be prone to error due to a mismatch in the frequencies of the received signal and the signal from the LO. Using decoded data tends to lead to a slower system that consumes more power.

Figure 5:
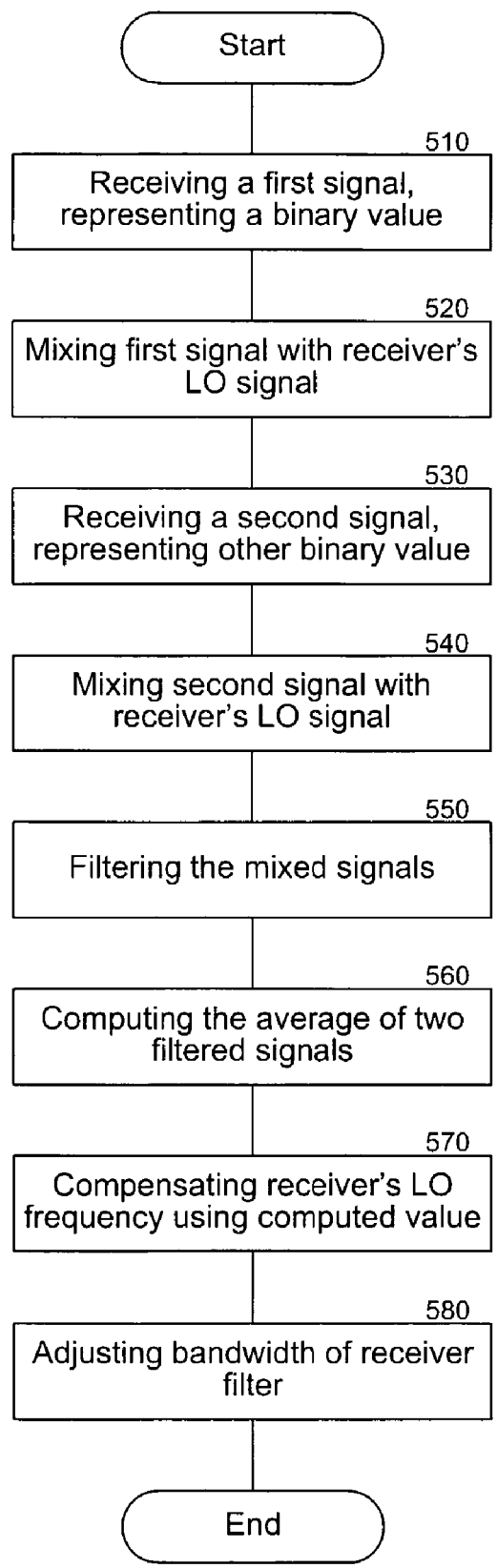
FIG. 5 illustrates an example of process steps involved in frequency matching of a receiver and transmitter local oscillators and adjusting receiver bandwidth, according to an embodiment of the invention.

FIG. 5 illustrates an example of process steps involved in frequency matching of receiver and transmitter local oscillators and adjusting the receiver's bandwidth, according to embodiments of the invention. At step 510 a first signal, representing a first binary value, is received by a receiver. At step 520 the received first signal is mixed with a signal generated by the receiver's LO, wherein the receiver's LO frequency is the same as that expected from the transmitter's LO. At step 530 a second signal, representing a second binary value, is received by the receiver. At step 540 the received second signal is mixed with the signal generated by the receiver's LO. At step 550 the mixed signals pass through a receiver filter. At step 560 the difference between the transmitter's LO frequency and the receiver's LO frequency is computed based on the average of the two filtered signals. At step 570 the receiver's LO frequency is compensated by the computed value. At step 580 the bandwidth of the variable receiver filter is adjusted around the compensated receiver's LO frequency such that to allow a signal with maximum frequency error to pass.

Note that in any of the above embodiments the receiver, based on the computed values, may choose to:
    center its carrier frequency but not change its bandwidth;
    change its bandwidth but not center its carrier frequency;
    center its carrier frequency and change its bandwidth; or
    not center its carrier frequency and not change its bandwidth.

In yet another embodiment, data is transmitted by a first transceiver and received by a second transceiver. In this embodiment the second transceiver, using the received signals, computes the frequency error and if needed adjusts its carrier frequency and bandwidth in a manner similar to any of the above mentioned embodiments. However, in this embodiment the second transceiver sends a message to the first transceiver including the computed error information. In response the first transceiver adjusts its carrier frequency for the rest of the data transfer session.

CONCLUSION

Aspects of the invention may be stored or distributed on computer-readable media, including magnetically or optically readable computer discs, as microcode on semiconductor memory, nanotechnology memory, or other portable data storage medium. Indeed, computer-implemented instructions, data structures, screen displays, and other data under aspects of the invention may be distributed over the Internet or over other networks (including wireless networks), on a propagated signal on a propagation medium (e.g., electromagnetic wave(s), a sound wave(s), etc.) over a period of time, or may be provided on any analog or digital network (packet switched, circuit switched or other scheme). Those skilled in the relevant art will recognize that portions of the invention reside on a server computer, while corresponding portions reside on a client computer such as a mobile device.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

All of the above patents and applications and other references, including any that may be listed in accompanying filing papers, as well as the U.S. Utility patent Application entitled "Dual Mode AM-FM Receiver with I-Q Decoding, such as for Utility Data Collection," filed Mar. 30, 2005, assigned to Itron, Ser. No. 11/096,269, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description describes certain embodiments of the invention, and describes the best mode contemplated, no matter how detailed the above appears in text, the invention can be practiced in many ways. Details of the compensation system described above may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention

We claim:

1. In a communication system, an apparatus for compensating for drift between a receiver and a transmitter local oscillator frequencies, the apparatus comprising:
   a receiver for receiving a first frequency modulated signal with frequency ($F_T + f_1$) representing a first data value, and a second frequency modulated signal with frequency ($F_T - f_2$) representing a second data value, where $F_T$ is a local oscillator frequency of the transmitter, and $f_1$ and $f_2$ are frequency deviations for modulating the first and the second data values, respectively;
   a mixer for down-converting or intermediate frequency (IF) converting the first and the second received signals by mixing the first and second received signals with the receiver's local oscillator frequency, wherein the receiver's local oscillator frequency is associated with conversion frequency; and
   calculating a drift between the transmitter's local oscillator frequency and the receiver's local oscillator frequency, $F_D$, by: $F_D = F_{M2} + f_2(F_{M1} - F_{M2})/(f_1 + f_2)$, where $F_{M1}$ and $F_{M2}$ are first and second down- or IF-converted frequencies, respectively.

2. The apparatus of claim 1, wherein during an initial communication period, the receiver widens a receiver bandwidth and receives data at a first data rate, and wherein during a subsequent period the receiver adjusts the bandwidth, based on the received data, and receives subsequent data at a second data rate that is higher than the first data rate.

3. The apparatus of claim 1, wherein the first and second data values are "1" and "0," respectively, and wherein at least one controller provides a compensation signal and adjusts a bandwidth of the receiver based on an estimated frequency drift and compensated receiver frequency.

4. The apparatus of claim 1, wherein one of the down-converted signals is a baseband in-phase signal and the other down-converted signal is a baseband quadrature signal.

5. In a wireless data acquisition network, a system for narrowing a receiver bandwidth for receiving higher rate data signals, the system comprising:
   a receiver for receiving a known frequency modulated (FM) data signal at a first data rate, with frequency ($F_T + f$) or ($F_T - f$), wherein $F_T$ is a corresponding transmitter's LO frequency and f is a frequency deviation for modulating the data value;
   a mixer for down-converting the signal by mixing it with a signal generated by the receiver LO, wherein the receiver LO frequency is an estimate of the transmitter's LO frequency;
   a processor for computing a difference between the transmitter's LO frequency and the receiver's LO frequency by subtracting the deviation frequency f from the down-converted signal if the received signal represents the data value with frequency ($F_T + f$), or by adding the deviation frequency f to the down-converted signal if the received signal represents the data value with frequency ($F_T - f$); and
   a controller for centering and narrowing the receiver bandwidth, using the down-converted signal, to allow higher data rate signals with maximum estimated drift to pass, if the bandwidth needs to be adjusted.

6. A utility meter data communication method comprising:
   transmitting binary data signals at a first data rate, by a first utility meter data transceiver;
   receiving at least one binary data signal, by a second utility meter data transceiver;
   zero-IF or IF converting the received signal;
   computing a value that is a difference between the first transceiver carrier frequency and the second transceiver carrier frequency, using the converted signal; and
   transmitting the computed information from the second transceiver to the first transceiver to be used for adjusting the first transceiver's carrier frequency, if adjustment is needed.

7. The method of claim 6, wherein the second utility meter data transceiver alters a bandwidth of the second transceiver, based on the computed difference value, if the bandwidth needs to be altered.

8. The method of claim 7, wherein bandwidth alteration comprises: centering the bandwidth around a frequency substantially similar to the first transceiver's frequency; narrowing the bandwidth; and transmitting subsequent data at a second data rate that is higher than the first data rate.

9. In a communication system, an apparatus for compensating for drift between receiver and transmitter local oscillator frequencies, the apparatus comprising:
   a receiver for receiving a first frequency modulated signal with frequency ($F_T + f_1$) representing a first data value, and a second frequency modulated signal with frequency ($F_T - f_2$) representing a second data value, where $F_T$ is a local oscillator frequency of the transmitter, and $f_1$ and $f_2$ are frequency deviations for modulating the first and the second data values, respectively;
   a mixer for mixing the first frequency modulated signal with frequency ($F_R + f_1$) to generate a first mixed signal and mixing the second frequency modulated signal with frequency ($F_R - f_1$) to generate a second mixed signal, where $F_R$ is a local oscillator frequency of the receiver, and wherein the receiver local oscillator frequency is an estimation of the local oscillator frequency of the transmitter; and
   calculating a drift between the transmitter local oscillator frequency and the receiver local oscillator frequency by averaging between the frequencies of the first and the second mixed signals.

* * * * *